United States Patent Office 2,807,612
Patented Sept. 24, 1957

2,807,612

IMPROVED PROCESS FOR THE PREPARATION OF LOWER FATTY ACID ESTERS OF CELLULOSE

Bayard T. Lamborn, Matawan, N. J., assignor to Hercules Powder Company, Wilmington, Del., a corporation of Delaware No Drawing. Application April 3, 1953,
Serial No. 346,801

6 Claims. (Cl. 260—227)

This invention relates in general to the preparation of a cellulose derivative and in particular to a process and catalyst for the acylation of cellulosic material containing replaceable hydroxyl groups.

In processes for acylation of cellulose such as, for example, the preparation of cellulose acetate or the like, it is usual to carry out the acylation reaction in the presence of an acid catalyst. Thus, in the conventional process for preparing cellulose acetate, generally comprising reacting cellulose with an acylation agent such as acetic anhydride, it has been found that this acylation reaction is catalyzed by a strong acid and further it has been found that the selection of the catalyst has a striking effect on the reaction rate. Previously, sulfuric acid has been the catalyst of choice since it promotes a reaction rate quick enough to be economically practical and at the same time slow enough to be subject to suitable process control. Unfortunately, however, the use of sulfuric acid as a catalyst for this reaction is undesirable inasmuch as it tends to produce a cellulose ester which is characterized by containing significant amounts of chemically bound sulfates which, unless substantially all removed during subsequent hydrolysis and washing treatments, promote instability and decomposition of the product. It is well known that it is difficult and tedious to remove such chemically bound sulfates to a degree sufficient to assure satisfactory stability.

In order to avoid this combined sulfate contamination, alternative catalysts have been proposed, but these have not been entirely satisfactory. Zinc chloride in relatively large amounts (25-50% by weight based on the cellulose) together with application of heat effects reaction, but the rate of reaction is excessively slow, requiring from 24 to 48 hours or even longer, and the product obtained is usually nonhomogeneous and exhibits poor solubility characteristics. Perchloric acid is known to be an exceedingly active catalyst, but it is so active that the reaction is exceedingly difficult to control, with the result that nonhomogeneous products are obtained which are excessively degraded in viscosity. The quantity of perchloric acid which must be used if the reaction is not to be uncontrollably fast is very small and extremely critical (0.10–0.25%, based on the cellulose) so that small absolute errors in measuring the perchloric acid create relatively large effects on the rate of reaction. It has been proposed to mix either nitric acid or phosphoric acid with perchloric acid as acylation catalysts, the nitric or phosphoric acids allegedly functioning as "catalyst retarders" to slow down the uncontrollably fast catalytic activity of perchloric acid alone. Unfortunately, however, neither nitric nor phosphoric acid has any noticeable retarding action on the catalytic activity of perchloric acid. Moreover, when mixtures of nitric acid and perchloric acid are employed, the nitric acid component in the catalyst combines rapidly and almost quantitatively with the cellulose, and hence is not present long enough in a free state to act as a catalytic buffering or retarding agent. With mixtures of perchloric acid with either nitric or phosphoric acids nonhomogeneous acylation products result which are excessively degraded in viscosity.

Various salts of perchloric acid such as magnesium perchlorate and zinc perchlorate have been proposed as acylation catalysts, but these are very low in catalytic activity with the result that reaction time is inordinately long and the products obtained are nonhomogeneous and of poor solubility characteristics. Hydrochloric acid and mixtures of hydrochloric acid and zinc chloride have also been proposed, but they exhibit the same faults exhibited by the perchlorate salts, i. e., low catalytic activity with attendant slow reaction rate and nonhomogeneity of product.

Now in accordance with the present invention cellulosic material, such as cellulose and cellulose ethers, containing replaceable hydroxyl groups is acylated in the presence of noncombining acylation catalyst consisting essentially of mixtures of perchloric acid and at least one metal salt of an acid of the group consisting of hydrochloric, hydrobromic, phosphoric and sulfonic acids, the metal of said metal salt having an electrode potential between about $+1.7$ and about $-0.7$. A preferred acylation catalyst consists essentially of about ¼% to ¾% perchloric acid and about ¼% to 2% zinc chloride, based on the weight of cellulosic material.

The general nature of the invention having been set forth hereinbefore, the following examples are given in illustration but not in limitation of preferred procedures within the scope of the invention.

EXAMPLE 1

A pretreated cellulose mix was prepared by spraying 30 parts of cotton linters with 12 parts of glacial acetic acid and the resulting product was placed in a suitable reaction vessel. An acylation mix was separately prepared by mixing together 78 parts by volume of acetic anhydride, 110 parts by volume of methylene chloride, 1 part by volume of a 7.5% solution of the zinc chloride in glacial acetic acid, and 1 part by volume of a 7.5% solution of perchloric acid in glacial acetic acid, thus yielding a mixture containing ¼% each of zinc chloride and perchloric acid based on the weight of cellulosic material. This acylation mix was then poured into the reaction vessel containing the pretreated cotton linters and the mass thoroughly agitated. The reaction mixture was externally cooled for the first half hour to maintain the temperature at about 20° C. after which external heating was applied to maintain the temperature at about 40° C. The acylation reaction proceeded uniformly and without violence, and was subject to complete control throughout its course. In order to permit comparison between acylation catalysts, there was selected as an arbitrary reaction end point that point in the reaction where a substantially fiber-free acylation dope was first produced. At the end of 5½ hours, the reaction mixture had reached this end point. Following subsequent hydrolysis and washing steps, the product obtained from this reaction was a satisfactory acylated cellulose of good uniformity and stability, suitable for uses of cellulose acetate as known to those skilled in the art.

In a similar reaction procedure, identical except for the exclusion of the zinc chloride, the reaction proceeded much more rapidly and unevenly and was not subject to complete control. At the end of 2⅔ hours, the reaction had proceeded to the extent indicated by the production of fiber-free dope, but at the same time the viscosity of the acylated cellulose was significantly impaired.

EXAMPLE 2

The procedure of Example 1 was repeated utilizing

½% zinc chloride and ¼% perchloric acid based on the weight of cellulose. At the end of 6¼ hours' reaction period, the reaction was judged to be satisfactorily complete in that a fiber-free acylation dope was produced and the reaction product after hydrolysis and washing was a cellulose acetate with satisfactory viscosity, uniformity and stability. The acylation reaction proceeded uniformly and without violence, and was subject to complete control throughout its course.

Similar reactions were then repeated utilizing as the acylation catalyst 2% zinc chloride with ¼% perchloric acid, ¼% aluminum chloride with ¼% perchloric acid, ¼% cupric chloride with ¼% perchloric acid, and ¼% cobalt chloride with ¼% perchloric acid. The results of these acylation procedures in all cases were the production of satisfactory cellulose acetate having good uniformity and stability at the end of a reasonable reaction period as set forth in Table 1. The acylation reaction in every case proceeded uniformly and without violence, and was subject to complete control throughout its course.

Table 1

| Example | Acylation Reaction | Catalyst Components | Reaction Time at 40-45° C. |
|---|---|---|---|
| 1 (control) | Acetylation | ¼% perchloric acid | 2⅔ hours (impaired viscosity). |
| 1 | do | ¼% perchloric acid<br>½% zinc chloride | 5½ hours. |
| 2 | do | ½% zinc chloride<br>¼% perchloric acid | 6¼ hours. |
| 2 | do | 2% zinc chloride<br>¼% perchloric acid | 4 days. |
| 2 | do | ¼% aluminum chloride<br>¼% perchloric acid | 4½ hours. |
| 2 | do | ¼% cupric chloride<br>¼% perchloric acid | 24 hours. |
| 2 | do | ¼% cobalt chloride<br>¼% perchloric acid | 5 days. |

EXAMPLE 3

One hundred parts chemical cellulose moistened with 44 parts glacial acetic acid was placed in a suitable reaction vessel, and to this was added 834 parts cold methylene chloride and 180 parts cold acetic anhydride. The catalyst was added as a solution of 0.767 part 72% perchloric acid and 2.05 parts 70% zinc chloride dissolved in 96.6 parts acetic anhydride. A mixture consisting of 19.6 parts sorbic acid and 19.6 parts acetic anhydride was then added. The esterification was carried out by kneading the reaction mixture for 1.7 hours while the temperature gradually rose to 45° C. and by continued kneading for 1.7 hours at 45° C. The acylation reaction proceeded uniformly and without violence, and was subject to complete control throughout its course. At the end of 3.4 hours the reaction was judged to be satisfactorily complete in that a fiber-free acylation dope was produced, and the reaction product after hydrolysis and washing was a cellulose acetate sorbate having a sorboyl substitution of 0.03 group and an acetyl substitution of 2.44 groups per glucose anhydride unit in the cellulose, and having satisfactory viscosity, uniformity and stability.

EXAMPLE 4

The procedure of Example 1 was repeated utilizing as catalyst 5% zinc chloride and 1% perchloric acid based on the weight of cotton. The reaction mixture was stirred for two hours and fifty minutes, at the end of which time the reaction was judged to be satisfactorily complete and a substantially uniform cellulose acetate product having satisfactory viscosity and stability characteristics was formed.

EXAMPLE 5

Twenty parts cellulose moistened with 10 parts acetic acid was mixed with a solution of 100 parts propionic anhydride, 3.62 parts sorbic acid, and 166 parts methylene chloride along with 0.16 part 72% perchloric acid and 0.43 part 70% aqueous zinc chloride solution. The esterification was carried out with mixing at approximately 45° C. for 5 hours when the reaction was judged to be satisfactorily complete in that a fiber-free acylation dope was produced and the product after hydrolysis and washing was a cellulose propionate sorbate having satisfactory viscosity, uniformity and stability. The acylation reaction proceeded uniformly and without violence, and was subject to complete control throughout its course.

EXAMPLE 6

Five hundred parts by weight of a fibrous hydroxyethyl cellulose containing 0.45 hydroxyethyl group for each glucose anhydride unit in the cellulose was pretreated with 210 parts by volume of glacial acetic acid in a suitable container and allowed to stand at room temperature for approximately 48 hours. An acylation mixture was separately prepared by mixing together 1280 parts by volume of acetic anhydride, 1960 parts by volume of methylene chloride, 1.49 parts by volume of 67% perchloric acid, and 3.06 parts by volume of 67.7% aqueous zinc chloride solution, and the mixture was cooled to about 5° C. The cooled acylation mixture was then poured over the pretreated hydroxyethyl cellulose and after thorough wetting the entire mixture was transferred to a suitable reaction vessel. The temperature of the mixture in the reaction vessel was brought to approximately 35° C. with agitation. Acylation proceeded uniformly and without violence, and was subject to complete control throughout its course. At the end of 3½ hours' reaction period, the reaction was judged to be satisfactorily complete in that a fiber-free acylation dope was produced and the product after washing and purification was a primary hydroxyethyl cellulose acetate with satisfactory viscosity, uniformity and stability.

EXAMPLE 7

Following substantially the same procedure set forth in Example 1, similar acetylation reactions were performed utilizing as the acylation catalyst 1 part by volume of a perchloric acid solution prepared by diluting 8.4 parts by volume of 60% perchloric acid with glacial acetic acid to make 100 parts by volume and 0.246 part by weight of zinc bromide, 1 part by volume of the above perchloric acid solution with 0.74 part by weight zinc bromide, 1 part by volume of the above perchloric acid solution with 0.05 part by weight of zinc phosphate, and 1 part by volume of the above perchloric acid solution with 0.45 part by weight of zinc toluene sulfonate. The results of these acylation procedures in all cases were the production of satisfactory cellulose acetate having good uniformity and stability at the end of a reasonable reaction period as set forth in Table 2 following. The acylation reaction in each case proceeded uniformly, and was subject to complete control throughout its course.

Table 2

| Example | Acylation Reaction | Catalyst Components | Reaction Time at 40–45° C., hours |
|---|---|---|---|
| 7 | Acetylation | 0.246 part by weight zinc bromide / 1 part by volume perchloric acid solution [1] | 2¼ |
| 7 | do | 0.74 part by weight zinc bromide / 1 part by volume perchloric acid solution [1] | 3½ |
| 7 | do | 0.05 part by weight zinc phosphate / 1 part by volume perchloric acid solution [1] | 7½ |
| 7 | do | 0.45 part by weight zinc toluene sulfonate / 1 part by volume perchloric acid solution [1] | 6 |

[1] Perchloric acid solution prepared by diluting 8.4 parts by volume of 60% perchloric acid to 100 parts by volume with glacial acetic acid.

The preceding Examples 1–7, inclusive, illustrate clearly how small amounts of suitable metal salts in accordance with this invention when mixed with perchloric acid effectively regulate the otherwise uncontrollable catalytic reactivity of perchloric acid when used alone as an acylation catalyst. In all cases employing the mixed catalysts of this invention the acylation reaction in Examples 1–7 proceeded uniformly and without violence, and was subject to complete control throughout its course, and the product obtained had satisfactory viscosity, uniformity and stability. This is in marked contract to the unfavorable behavior of perchloric acid alone, as illustrated hereinbefore, where the acylation reaction proceeded much more rapidly and unevenly and was not subject to complete control, and where the viscosity of the product obtained was significantly impaired.

The general reaction contemplated according to this invention is the acid-catalyzed acylation of cellulose, for example, to introduce into the cellulose molecule acyl radicals such as acetyl, propionyl, butyryl, caproyl, stearyl, crotonyl, phthalyl, sorboyl, and the like, to produce single esters, or a mixture of acyl radicals such as acetyl propionyl, acetyl butyryl, acetyl stearyl, acetyl crotonyl, acetyl sorboyl, propionyl sorboyl, acetyl phthalyl, butyryl stearyl, and the like, to produce mixed esters. Similarly, the acid-catalyzed acylation of cellulose ethers containing replaceable hydroxyl groups, to introduce into such cellulose ethers various acyl radicals such as acetyl, propionyl, butyryl, caproyl, stearyl, crotonyl, phthalyl, sorboyl, and the like to produce mixed ether-esters such as ethyl cellulose acetate, hydroxyethyl cellulose acetate, carboxymethyl cellulose acetate, methyl cellulose stearate, allyl cellulose acetate, benzyl cellulose acetate, hydroxyethyl cellulose propionate, and the like is likewise within the scope of this invention. Thus, it is apparent that the present invention embraces any acid-catalyzed acylation involving cellulosic material containing hydroxyl groups which are replaceable by acyl groups. The acylating reagent in all cases is generally the desired acid anhydride or anhydrides or mixed anhydrous acid-acid anhydride.

As the cellulosic raw material, there is utilized any suitable and available cellulose source such as cellulose in any form, wood or wood pulp, cotton, cotton linters, regenerated cellulose, chemical cellulose, and other sources of cellulose, in either the raw or purified state, cellulose ethers containing replaceable hydroxyl groups, and the like, as desired.

The catalysts of this invention are mixtures of perchloric acid and at least one metal salt of an acid of the group consisting of hydrochloric, hydrobromic, phosphoric and sulfonic acids, the metal radical of the metal salt having an electrode potential between about +1.7 and about −0.7. (Handbook of Chemistry and Physics, 30th edition, page 1439.) Such metals include, for example, aluminum whose electrode potential is about +1.7, zinc (+0.76), cobalt (+0.28), copper (−0.34), as well as other metals lying within this range. It is important that the electrode potential of the metal radical of the salt component of the catalyst mixtures of this invention be within the range between about +1.7 and −0.7. Such catalyst mixtures promote acylation reactions uniformly and smoothly to completion within reasonable reaction times and subject to complete control throughout. On the other hand, catalyst mixtures containing salts of metals whose potentials are substantially higher than the range set forth herein are characterized by sluggish or no catalytic activity. Furthermore, catalyst mixtures containing salts of metals whose potentials are significantly below the range set forth are characterized by excessive catalytic activity so that the acylation reaction becomes excessively fast and therefore difficult to control, with the result that nonhomogeneous products are obtained.

The anion of the salt component of the catalyst mixtures of this invention is derived from hydrochloric, hydrobromic, phosphoric or sulfonic acids, and any sulfonic acid is suitable for the purposes of this invention. Thus, suitable sulfonic acids include, for example, alkane sulfonic acids, mixed alkane sulfonic acids, methane sulfonic-, ethane sulfonic-, propane sulfonic-, hexane sulfonic-, ethionic-acid, and the like; aromatic sulfonic acids, benzene sulfonic-, toluene sulfonic-, xylene sulfonic-, naphthalene sulfonic-acid, and the like; cycloaliphatic sulfonic acids such as cyclohexane sulfonic acid, substituted sulfonic acids including chloromethane sulfonic-, bromoethane sulfonic-, sulfoacetic-, chlorosulfoacetic-acid, and the like.

It is within the scope of this invention to employ one or more suitable metal salts as hereinbefore set forth in admixture with perchloric acid in preparing the catalyst mixtures in accordance with this invention.

While the principal and preferred method for controlling the rate of the acylation reaction is by proper selection of catalyst ingredients and proportions thereof, it is also apparent that the reaction rate may be controlled through the addition of a greater or lesser quantity of the catalyst. Thus, a more rapid reaction may be promoted through the use of a greater proportion of perchloric acid and a lesser proportion of the metal salt. Alternatively, it is possible to control the reaction while maintaining the same selection and proportions of catalyst ingredients by merely including a greater or lesser percentage of the mixed catalyst based on the amount of the reaction mixture. It is, however, noted that a similar method of procedure is not satisfactory to control the activity of perchloric acid by itself in the absence of the metal salt inasmuch as the amount of perchloric acid necessary to catalyze the reaction is extremely minute and, accordingly, accurate control of the amount of perchloric acid catalyst is extremely difficult except according to the present invention. Furthermore, when perchloric acid is used without a modifying cocatalyst, the presence of impurities having the ability to neutralize perchloric acid in either the cellulose composition or the acylation mixture causes a high degree of irregularity in the catalyst activity.

It is, of course, obvious that the activity of the catalyst mixture depends at least in part on the proportions of the components and also at least in part on the selection of components. Thus, when an aluminum salt, for example, is selected, the suppression of catalytic activity is less pronounced than when a copper salt, on the other hand, is employed. For this reason, among others, the proportions and amounts of the components employed in the mixed catalyst may be varied over a considerable range to suit the particular acylation conditions desired. To illustrate, when employing a mixed composition of perchloric acid and zinc chloride as a catalyst for the acetic anhydride acylation of cellulose, it has been found that a total catalyst of about ¼% to about 8%, based on the weight of cellulose, may be employed, with a preferred amount of between about ½% and about 3%; likewise, the ratio of perchloric acid to zinc chloride may be varied between about 1:8 and about 4:1, and preferably between about 1:4 and about 1:1. When other catalyst components are employed instead of perchloric acid and zinc chloride, appropriate modifications in amounts and proportions are made as will be apparent to those skilled in the art. In general, however, the above proportions and amounts set forth above for mixtures of zinc chloride and perchloric acid apply for other mixed catalysts in accordance with this invention.

The catalyst mixtures of this invention are noncombining in character, i. e., they do not combine chemically with cellulose in the manner in which sulfuric and nitric acids combine with cellulose. Moreover, the catalyst mixtures of this invention are substantially anhydrous compositions because of the substantially anhydrous character of the acylation mixtures in which they are employed. Small amounts of water which may be associated initially with the components of the catalyst mixtures, such as, for example, water of hydration of the salt components, are immediately consumed in converting an equivalent quantity of the acid anhydride used as the acylating agent into the corresponding anhydrous acid.

As will also be apparent to those skilled in the art, the new catalysts of this invention offer not only freedom from objectionable features of the prior catalysts, but in addition afford wide flexibility of control. When utilizing these catalysts, reactants of widely different inherent activity may be employed without necessitating procedural changes. Thus, for example, by adjustments in catalytic composition, a preferred reaction rate may be attained with various different acylating agents such as, for example, acetic anhydride, propionic anhydride, and the like.

The acylation reaction according to this invention may be carried out in any desired and appropriate medium as will be apparent to those skilled in the art. Thus, for example, it is presently preferred to carry out this acylation reaction under substantially anhydrous conditions and in the presence of suitable organic solvents. When a substantially fully acylated cellulose acetate is desired, it is presently preferred to include in the reaction mixture a suitable solvent for cellulose triacetate such as, for example, methylene chloride or the like, thus obtaining a smooth, substantially nongelling cellulose acetate dope. On the other hand, when the present invention is utilized for the preparation of a cellulose ester having higher acyl groups and the like therein, the cellulose ester produced frequently is soluble in the acylating composition and accordingly an auxiliary solvent is not desired. These and other adjustments of the reaction medium will be within the ability of those skilled in the art and may be made without departure from the spirit and scope of the present invention. It is, of course, obvious that fibrous acylation reactions, including both partial acylation of the replaceable hydroxyl groups in the cellulosic material as well as complete acylation of the replaceable hydroxyl groups therein, wherein the cellulose ester formed during the acylation reaction remains undissolved and in the same particulate or fibrous form as the starting cellulosic material throughout the reaction, come within the scope of this invention.

This is a continuation-in-part of my application Serial No. 181,317, filed on August 24, 1950, now abandoned, which in turn is a continuation-in-part of my application Serial No. 79,917, filed on March 5, 1949, and which is now abandoned.

What I claim and desire to protect by Letters Patent is:

1. In a process for the acetylation of cellulose, the improvement comprising reacting cellulose with a mixture of anhydrous acetic acid and acetic anhydride in the presence of a catalytic amount of about ¼% to about 8%, based on said cellulose, of noncombining acetylation catalyst consisting essentially of mixtures of perchloric acid and zinc chloride, the ratio of perchloric acid to zinc chloride being between about 1 to 8 and about 4 to 1 by weight.

2. In a process for the propionylation of cellulose, the improvement comprising reacting cellulose with a mixture of anhydrous propionic acid and propionic anhydride in the presence of a catalytic amount of about ¼% to about 8%, based on said cellulose, of noncombining propionylation catalyst consisting essentially of mixtures of perchloric acid and zinc chloride, the ratio of perchloric acid to zinc chloride being between about 1 to 8 and about 4 to 1 by weight.

3. A process comprising mixing fibrous cellulose and an anhydrous acetic acid and adding thereto a mixture of acetic anhydride in a cellulose ester solvent comprising methylene chloride, together with anhydrous acetic acid solutions of zinc chloride and perchloric acid in an amount equivalent to about ¼% each of said zinc chloride and said perchloric acid based on the weight of cellulose and reacting the mixture until a substantially fiber-free reaction dope is obtained.

4. As an acylation catalyst, a substantially anhydrous composition consisting essentially of mixtures of perchloric acid and zinc chloride, the ratio of perchloric acid to zinc chloride being between about 1 to 8 and about 4 to 1 by weight.

5. In a process for the acylation of cellulosic material of the group consisting of cellulose, partial esters of cellulose, partial ethers of cellulose, and partial ether-esters of cellulose containing hydroxyl groups replaceable with lower fatty acid substituent groups, the improvement comprising reacting said cellulosic material with a mixture of anhydrous lower fatty acid and lower fatty acid anhydride in the presence of a catalytic amount of about ¼% to about 8%, based on said cellulose, of noncombining esterification catalyst consisting essentially of mixtures of perchloric acid and zinc chloride, the ratio of perchloric acid to zinc chloride being between about 1 to 8 and about 4 to 1 by weight.

6. In a process for the preparation of lower fatty acid esters of cellulose, the improvement comprising reacting cellulose with a mixture of anhydrous lower fatty acid and lower fatty acid anhydride in the presence of a catalytic amount of about ¼% to about 8%, based on said cellulose, of noncombining esterification catalyst consisting essentially of mixtures of perchloric acid and zinc chloride, the ratio of perchloric acid to zinc chloride being between about 1 to 8 and about 4 to 1 by weight.

References Cited in the file of this patent

UNITED STATES PATENTS

| | | |
|---|---|---|
| 2,072,261 | Haney | Mar. 2, 1937 |
| 2,348,001 | Gibson et al. | May 2, 1944 |